(12) United States Patent
Nonaka et al.

(10) Patent No.: US 6,309,984 B1
(45) Date of Patent: Oct. 30, 2001

(54) AGENT FOR TREATING WATER REPELLENCY SUPPLY CLOTH AND WATER REPELLENCY SUPPLY CLOTH

(75) Inventors: Jun-ichi Nonaka, Takarazuka; Ryutaro Hidaka, Higashiosaka, both of (JP)

(73) Assignee: Soft 99 Corporation, Osaka (JP)

( * ) Notice: Subject to any disclaimer, the term of this patent is extended or adjusted under 35 U.S.C. 154(b) by 0 days.

(21) Appl. No.: 09/363,657

(22) Filed: Jul. 30, 1999

(30) Foreign Application Priority Data

May 28, 1999 (JP) .................................................. 11-150711

(51) Int. Cl.⁷ ............................. B32B 27/04; B32B 27/12
(52) U.S. Cl. ................................................. 442/81; 442/79
(58) Field of Search ......................................... 442/79, 81

(56) References Cited

FOREIGN PATENT DOCUMENTS

| 02175355 | 7/1990 | (JP) . | |
|---|---|---|---|
| 02202971 | 8/1990 | (JP) . | |
| 11152462 * | 6/1999 | (JP) | A47L/13/16 |

\* cited by examiner

Primary Examiner—Terrel Morris
Assistant Examiner—Ula C. Ruddock
(74) Attorney, Agent, or Firm—Armstrong, Westerman, Hattori, McLeland & Naughton LLP

(57) ABSTRACT

A water repellency supply cloth supplying a water-repellent film having excellent persistency by a simple operation of polishing the body of a car or wiping out waterdrops after car washing is provided. A trimethyl siloxi silicate derivative having free hydroxyl groups is added to a dimethylpolysiloxane solution of trimethyl siloxi silicate expressed in the following formula (1) by 10 to 60 parts by weight with respect to 100 parts by weight of trimethyl siloxi silicate, and amino modified dimethylpolysiloxane, a surface active agent and/or fine powder is dissolved in an organic solvent or dispersed in water at need, to obtain an agent for treating a water repellency supply cloth according to the present invention. Cloth is impregnated with the agent for treating a water repellency supply cloth to contain a nonvolatile component corresponding to 1.0 to 50.0 parts by weight of the aforementioned agent for treating a water repellency supply cloth with respect to 100 parts by weight of the cloth, and thereafter a volatile component is vaporized to obtain the inventive water repellency supply cloth.

$$[(CH_3)_3SiO_{1/2}]_X \cdot [SiO_2]_Y \qquad (1)$$

where X=1 to 3 and Y=0.5 to 8.

10 Claims, No Drawings

AGENT FOR TREATING WATER REPELLENCY SUPPLY CLOTH AND WATER REPELLENCY SUPPLY CLOTH

BACKGROUND OF THE INVENTION

1. Field of the Invention

The present invention relates to an agent for treating a water repellency supply cloth and a water repellency supply cloth. More specifically, it relates to a water repellency supply cloth capable of supplying water repellency to the body of a car by simply wiping the body of the car and an agent for treating a water repellency supply cloth employed for this water repellency supply cloth.

2. Description of the Prior Art

In order to supply water repellency to the body of a car, a product prepared by adding dimethylpolysiloxane or fluororesin to the main component of natural wax or synthetic wax is generally employed after car washing.

However, this product has such problems that considerable time is required for a series of operations for sufficiently wiping out water after car washing, applying wax to the body of the car, drying a solvent and polishing the body of the car supplied with the wax, the wax feels heavy when polishing the body of the car, the body of the car cannot be polished with a good shine, and the like.

In order to overcome such problems, the inventors have developed a water repellency supply cloth prepared by impregnating woven or nonwoven fabric with an organopolysiloxane solution of trimethyl siloxy silicate, and submitted a patent application (Japanese Patent Application No. 9-296144 (1997), 10-192291(1998)). According to this water repellency supply cloth, a water-repellent film can be readily formed on the body surface of a car without completely wiping out waterdrops remaining on the body of the car, by simply wiping the body surface with the cloth.

However, although this water repellency supply cloth can attain a water-repellent effect to some extent, the formed water-repellent film is immediately washed out due to inferior fixability to the body of the car. When the car is once caught in the rain or mud adhering to its surface is washed out with water, therefore, the water repellency is lost. Thus, the water-repellent film formed by the conventional water repellency supply cloth is disadvantageously inferior in persistence.

SUMMARY OF THE INVENTION

The present invention has been proposed in consideration of the aforementioned problems of the prior art, and an object thereof is to improve fixability and persistence of a water-repellent film formed by a water repellency supply cloth.

The inventors have made deep study to find out that the aforementioned problems can be solved by introducing a specific trimethyl siloxy silicate derivative, and completed the present invention.

The present invention aims at handily forming a water-repellent film having excellent persistency on the body surface of a car. An agent for treating a water repellency supply cloth according to the present invention contains an organopolysiloxane solution of trimethyl siloxy silicate expressed in the following general formula (1), along with a trimethyl siloxy silicate derivative having free hydroxyl groups:

$$[(CH_3)_3SiO_{1/2}]_X \cdot [SiO_2]_Y \quad (1)$$

where X=1 to 3 and Y=0.5 to 8.

The aforementioned trimethyl siloxy silicate derivative having free hydroxyl groups is preferably blended by 10 to 60 parts by weight with respect to 100 parts by weight of trimethyl siloxy silicate.

The agent for treating a water repellency supply cloth according to the present invention further contains amino modified dimethylpolysiloxane, a surface active agent and/or organic or inorganic fine powder.

A water repellency supply cloth according to the present invention is prepared by impregnating cloth with a nonvolatile component in the aforementioned agent for treating a water repellency supply cloth according to the present invention.

This water repellency supply cloth preferably contains a nonvolatile component corresponding to 1.0 to 50.0 parts by weight of the aforementioned agent for treating a water repellency supply cloth with respect to 100 parts by weight of the cloth, for which ultrafine fiber of less than 0.3 denier is employed.

DESCRIPTION OF THE PREFERRED EMBODIMENTS

The agent for a water repellency supply cloth according to the present invention is mainly composed of an organopolysiloxane solution of trimethyl siloxy silicate expressed in the following formula (1) and contains a trimethyl siloxy silicate derivative having free hydroxyl groups dissolved in an organic solvent or dispersed in water, with addition of amino modified dimethylpolysiloxane, a surface active agent and/or fine powder at need. The present invention aims at improving fixability of a water-repellent film prepared from trimethyl siloxy silicate, organopolysiloxane and the like by adding a trimethyl siloxy silicate derivative having free hydroxyl groups to an organopolysiloxane solution of trimethyl siloxy silicate.

$$[(CH_3)_3SiO_{1/2}]_X \cdot [SiO_2]_Y \quad (1)$$

where X=1 to 3 and Y=0.5 to 8.

Organopolysiloxane employed in the present invention is preferably prepared from methylpolysiloxane or dimethylpolysiloxane, for example, which is nonvolatile at the ordinary temperature. More specifically, this organopolysiloxane is prepared by dissolving 30.0 to 60.0 percent by weight of trimethyl siloxy silicate in methylpolysiloxane or the like having viscosity in the range of 5 to 10,000 cst (25?). Examples of such organopolysiloxane are KF-7312K, KF-9021 and X-21-5250 by Shin-Etsu Chemical Co., Ltd., DC-593 and BY11-018 by Toray Dowcorning Silicone, VP-1038 by Wackerchemicals East Asia Ltd. and the like.

This organopolysiloxane solution of trimethyl siloxy silicate is blended to be impregnated by 0.5 to 25 parts by weight, preferably by 1 to 10 parts by weight, as trimethyl siloxy silicate with respect to 100 parts by weight of cloth. The cloth cannot attain a sufficient water repellency supply effect if the amount of the organopolysiloxane solution is smaller than 0.5 part by weight, while the cloth gets sticky to result in unpreferable feeling if the amount exceeds 25 parts by weight.

The agent for treating a water repellency supply cloth according to the present invention, which is mainly composed of an organopolysiloxane solution of trimethyl siloxy silicate, contains a trimethyl siloxy silicate derivative having free hydroxyl groups as an essential component, in order to improve the fixability of the water-repellent film. This trimethyl siloxy silicate derivative having hydroxyl groups is a linear or cyclic derivative prepared by partially substituting hydroxyl groups for methyl groups of trimethyl siloxy silicate expressed in the above formula (1). Examples of the derivative are Trefil R-910 by Toray Dowcorning Silicone, Silicone Resin MK by Wackerchemicals East Asia Ltd. and the like. Due to the addition of this trimethyl siloxy silicate derivative having hydroxyl groups, the formed water-repellent film is more stably fixed to the surface of the coating of the car and improved in persistency.

The trimethyl siloxy silicate derivative having hydroxyl groups is blended to be 10 to 60 parts by weight, preferably 20 to 50 parts by weight with respect to 100 parts by weight of trimethyl siloxy silicate. The effect of the added trimethyl siloxy silicate derivative having hydroxyl groups cannot be sufficiently attained if the amount thereof is smaller than 10 parts by weight, while no sufficient effect corresponding to the amount of addition can be attained if the derivative is blended in excess of 60 parts by weight.

In the present invention, amino modified dimethylpolysiloxane readily adsorbed by the surface of the coating can be employed as well. Amino modified dimethylpolysiloxane serves as an adjuvant improving the water repellency and fixability of the organopolysiloxane solution of trimethyl [siloxi] siloxy silicate. Amino modified dimethylpolysiloxane having excellent adsorbability is first adsorbed in the body surface of a body to form a base facilitating fixation of the organopolysiloxane solution of trimethyl siloxy silicate. Thus, the persistency of the water-repellent film is improved due to the synergistic action of amino modified dimethylpolysiloxane and the trimethyl siloxy silicate derivative having free hydroxyl groups.

This amino modified dimethylpolysiloxane is prepared by bonding amino groups to either side chains or ends or both of the side chains and ends in dimethylpolysiloxane. The amino modified dimethylpolysiloxane has viscosity in the range of 10 to 20,000 cst and an amine equivalent in the range of 300 to 15,000 at 25° C. Examples of side-chain type amino modified dimethylpolysiloxane are KF-393, KF-865 and KF-859 by Shin-Etsu Chemical Co., Ltd., BY16-892 by Toray Dowcorning Silicone, WR1100 by Wackerchemicals East Asia Ltd. and the like, examples of both end type amino modified dimethylpolysiloxane are KF-876A by Shin-Etsu Chemical Co., Ltd. and BY16-863 by Toray Dowcorning Silicone, and an example of a side-chain/both end type amino modified dimethylpolysiloxane is KF-862 by Shin-Etsu Chemical Co., Ltd. or the like. The amino modified dimethylpolysiloxane may be prepared by one of these products or a combination of at least two of these products.

The amount of amino modified dimethylpolysiloxane is preferably 5.0 to 50 parts by weight in general, more preferably by 10 to 30 parts by weight with respect to 100 parts by weight of the organopolysiloxane solution of trimethyl siloxy silicate. If the amount amino modified dimethylpolysiloxane is less than 5.0 parts by weight, adhesion between the organopolysiloxane solution of trimethyl siloxy silicate and the surface of the coating of the car is deteriorated. If the amount exceeds 50 parts by weight, amino modified dimethylpolysiloxane is excessively applied to the surface of the coating and tends to be inhomogeneous, to unpreferably exert bad influence on the water repellency.

The organopolysiloxane solution of trimethyl siloxy silicate, the trimethyl siloxy silicate derivative having free hydroxyl groups and the amino modified dimethylpolysiloxane are dissolved in an organic solvent or dispersed in water, to be provided as a cloth treating agent. The organic solvent is not particularly restricted, so far as the same can dissolve the aforementioned components and is volatile. Examples of the organic solvent are industrial gasoline, kerosene, mineral spirit, Stoddard solvent, normal paraffin, isoparaffin, alcohol, naphthene and odorless aliphatic solvents, a chlorine solvent, an aromatic solvent and a silicone solvent. The organic solvent is preferably harmless to the fiber of the cloth.

The amount of the solvent employed at this time is so adjusted that the cloth is impregnated with each component in the aforementioned range in response to the viscosity of the cloth and the employed organopolysiloxane and the amount of the trimethyl siloxy silicate derivative having hydroxyl groups.

Further, various additives such as a surface active agent and fine powder may be added to the inventive cloth treating agent. The surface active agent not only serves as an emulsifier when dispersing the components in water but also can improve water absorbance of the cloth impregnated with a silicone compound and thereby rendered hardly absorb water. The cloth treated with the aforementioned cloth treating agent can supply water repellency to the surface of the coating by simply wiping the surface of the coating, while its water absorbance may be deteriorated due to impregnation with the water-repellent component. In this case, it is difficult to wipe out waterdrops remaining after car washing with the cloth. Such a problem can be solved by adding the surface active agent.

The surface active agent can be preferably prepared from a Span-system active agent exerting no influence on the surface of the coating. Examples of the surface active agent are sorbitan monooleate, sorbitan monostearate, sorbitan sesquioleate, sorbitan monolaurate, sorbitan monopalmitate, sorbitan trioleate and the like. The surface active agent may be contained by 1 to 20 parts by weight in general, preferably by 5 to 10 parts by weight with respect to 100 parts by weight of the organopolysiloxane solution of trimethyl siloxy silicate. Sufficient water absorbance cannot be obtained if the amount of the surface active agent is less than 1 part by weight, while a large amount of surface active agent adheres to the surface of the coating to unpreferably reduce the water repellency if the amount exceeds 20 parts by weight.

An example of the fine powder is inorganic or organic fine powder generally employed as a polish. The fine powder not only serves as a carrier for the aforementioned silicone compound but also can adjust the amount of the water-repellent component adhering to the surface of the coating, remove stickiness of the surface of the treated cloth and supply silky feeling to the user. In addition, the fine powder may serve as a lubricant to smooth polishing depending on its material, while the water absorbance of the cloth can be improved by employing powder having excellent water absorbance.

Examples of such fine powder are kaolin, talc, quartzite, diatomaceous earth, perlite, calcium carbonate, zeolite, alumina, aluminum hydroxide, insoluble silicone resin powder (e.g., KMP-590 and X-52-1034 by Shin-Etsu Chemical Co., Ltd. and Trefil R-901 and R-902 by Toray Dowcorning Silicone), insoluble silicone rubber powder, polyolefin powder, tetrafluoroethylene resin powder, tetrafluoroethylene-propylene hexafluoride copolymer resin powder, higher fatty acid bisamide, higher fatty acid metallic soap, acrylic resin powder, epoxy resin powder, synthetic resin powder of nylon or the like, synthetic spherical silica powder and natural or synthetic inorganic or organic powder similar thereto.

The amount of the aforementioned fine powder may be 20 to 200 parts by weight, preferably 30 to 100 parts by weight with respect to 100 parts by weight of the organopolysiloxane solution of trimethyl siloxy silicate, depending on the material therefor. If the amount of the fine powder is smaller than 20 parts by weight, the surface of the cloth gets extremely sticky to result in bad feeling. If the amount of the fine powder exceeds 200 parts by weight, on the other hand, the fine powder excessively adheres to the surface of the cloth and excess powder unpreferably adheres to the surface of the coating as polished.

In addition, a component such as a fluorine compound generally employed as a polish, a washing assistant, an ultraviolet absorbent, a rust preventive, perfume, a coloring agent or the like may be blended at need.

The inventive cloth treating agent obtained in the aforementioned manner is impregnated into cloth. The cloth treating agent is impregnated to be 1.0 to 50 parts by weight, preferably 5 to 30 parts by weight with respect to 100 parts by weight of the cloth as the nonvolatile component of the cloth treating agent. A sufficient water-repellent effect cannot be supplied to the surface of the coating if the amount is smaller than 1.0 part by weight, while not only the cloth surface gets sticky by an excess water-repellent component but also the water-repellent component unpreferably excessively adheres if the amount exceeds 50 parts by weight.

The material for the cloth employed in the present invention can be prepared from either natural or synthetic fiber. Examples of the natural fiber are cotton, silk, hemp, wool and pulp, and those of the synthetic fiber are polyester, polypropylene, polyethylene, acrylic, nylon, vinylon, polyvinyl chloride, polyurethane, rayon and the like. Among these materials, olefinic synthetic fiber such as polypropylene or polyester having particularly excellent lipophilicity is particularly preferable since the same has excellent affinity to the silicone compound, which is a water-repellent component, and the water-repellent component is hardly lost when the cloth is washed. If such lipophilic fiber is singly used, however, water absorbance is insufficient although affinity to the water-repellent component is excellent. Therefore, it is preferable to combine hydrophilic fiber such as cotton, nylon or rayon with the lipophilic fiber such as polypropylene or polyester.

Further, it is preferable to singly employ ultrafine fiber of less than 0.3 denier in thickness or combine the same with ordinary fiber. Thus, the cloth not only excellently absorbs water and dirt, but hardly scratches the polished surface of the coating.

Such cloth may be prepared from any of woven fabric, nonwoven fabric and knitted fabric with no particular restriction, so far as the same serves as the base for the so-called chemical floorcloth. Among these materials, the nonwoven fabric is most preferably employed in consideration of the generality and the cost.

The cloth can be impregnated with the aforementioned components by any of various generally known coating methods employed in industrial production. The coating method can be selected from various types of wet coating methods employing effective components in the form of a solvent solution or a water dispersed solution such as brush coating, spray coating, a reverse roll coater method, a direct roll coater method, a gravure roll coater method, a kiss roll coater method, an inverse knife coater method, an air knife coater method, a dip roll coater method, an opposite knife coater method and the like, for example. The inventive water repellency supply cloth can be prepared by impregnating the cloth with the components by such a well-known method and thereafter vaporizing volatile components such as the organic solvent and water in a drier.

While the water repellency supply cloth obtained in the aforementioned manner can supply water repellency by simply wiping the surface of the coating of the car, the effect is further improved when the cloth is previously moistened with water. When the cloth contains water, the water-repellent component impregnated in the cloth is substituted by the water to readily go out from the cloth, so that the water repellency and glossiness, in particular, are improved as compared with the case of polishing the surface of the coating in a dry state. The inventive cloth, which can supply not only water repellency but also glossiness, is not only applicable to the body of a car but also can serve as a polishing cloth for household furniture, electrical appliances or interior products.

The foregoing and other objects, features, aspects and advantages of the present invention will become more apparent from the following detailed description of the present invention.

EXAMPLES

While the present invention is now described in further detail with reference to Examples, the present invention is not restricted to these Examples, as a matter of course. Chemicals used in Examples are listed below with trade names or product numbers.

(1) Organosiloxane Solution of Trimethyl siloxy Silicate

KF-7312K: product by Shin-Etsu Chemical Co., Ltd. having viscosity of 5,000 cst (25° C.) and concentration of 50.0 wt. %, dissolved in dimethylpolysiloxane having viscosity of 6 cst DC-593: product by Toray Dowcorning Silicone having viscosity of 560 cst (25° C.) and concentration of 33.0 wt. %, dissolved in dimethylpolysiloxane having viscosity of 350 cst VP-1038: product by Wackerchemicals East Asia Ltd. having viscosity of 2,000 cst (25° C.) and concentration of 30.0 wt. %, dissolved in dimethylpolysiloxane having viscosity of 350 cst (2) Trimethyl siloxy Silicate Derivative having Free Hydroxyl Groups Trefil R-910: product by Toray Dowcorning Silicone Wacker Silicone Resin MK: product by Wackerchemicals East Asia Ltd.

(3) Dimethylpolysiloxane

KF96-10: product by Shin-Etsu Chemical Co., Ltd., silicone oil having viscosity of 10 cst and specific gravity of 0.935 (25° C.)

KF96-500: product by Shin-Etsu Chemical Co., Ltd., silicone oil having viscosity of 500 cst and specific gravity of 0.970 (25° C.)

(4) Amino Modified Dimethylpolysiloxane

KF859: product by Shin-Etsu Chemical Co., Ltd. having viscosity of 60 cst, prepared by bonding amino groups to side chains of dimethylpolysiloxane X-22-161C: product by Shin-Etsu Chemical Co., Ltd. having viscosity of 72 cst, prepared by bonding amino groups to both ends of dimethylpolysiloxane KF862: product by Shin-Etsu Chemical Co., Ltd. having viscosity of 750 cst, prepared by bonding amino groups to both ends or side chains of dimethylpolysiloxane (5) Wax or Waxy Substance
  Paraffin Wax 130: product by Nippon Seiro Co., Ltd., hydrocarbon wax having a melting point of 55° C.
(6) Organic Solvent
  Pegasol 3040: product by Mobil Sekiyu K.K., turpentine having a distillation range of 155 to 197° C. and an aniline point of 56° C.
(7) Surface Active Agent
  Nonion OP-83RAT: product by Nippon Oil and Fats Co., Ltd., sorbitan sesquioleate of HLB 3.7
  Rheodol Super SP-L10: product by Kao Corporation, sorbitan monolaurate of HLB 8.6
(8) Fine Powder
  Trefil E-604: product by Toray Dowcorning Silicone, silicone powder having a mean grain size of 3 μm
  ARBOCEL BE 600-10: product by J. Rettenmaier & Soehne, cellulose powder having a mean fiber length of 18 μm
  ASP-072: product by Tsuchiya Kaolin Ind. Ltd., kaolin having a mean grain size of 0.3 μm Example 1

| Component | Amount (wt %) |
|---|---|
| dimethylpolysiloxane solution of trimethyl siloxy silicate (KF7312-K) | 10.0 |
| trimethyl siloxy silicate derivative having hydroxyl groups (R-910) | 1.0 |
| turpentine (Pegasol 3040) | 89.0 |
| total | 100.0 |

The dimethylpolysiloxane solution of trimethyl siloxy silicate and the trimethyl siloxy silicate derivative having hydroxyl groups were dissolved in turpentine, to obtain an agent for treating a water repellency supply cloth. This treating agent was impregnated in nonwoven fabric (fabric weight: 70 g/m²) consisting of blended ultrafine fiber (divided fiber of 50% each) of polypropylene and polyester by a gravure coater method and thereafter turpentine was transpired in a drier at 100?, to obtain a water repellency supply cloth impregnated with a nonvolatile component of 20 g/m².

Example 2

| Component Amount | (wt. %) |
|---|---|
| dimethylpolysiloxane solution of trimethyl siloxy silicate (DC-593) | 10.0 |
| trimethyl siloxy silicate derivative having hydroxyl groups (R-910) | 1.0 |
| amino modified dimethylpolysiloxane (KF-862) | 2.0 |
| turpentine (Pegasol 3040) | 87.0 |
| total | 100.0 |

The dimetlhylpolysiloxanie solution of trimethyl siloxy silicate, the trimethyl siloxy silicate derivative having hydroxyl groups and dimethylpolysiloxane were dissolved in turpentine, to obtain an agent for treating a water repellency supply cloth. This treating agent was impregnated in nonwoven fabric (fabric weight: 70 g/m²) consisting of blended ultrafine fiber (divided fiber of 50% each) of polypropylene and polyester by a gravure coater method and thereafter turpentine was transpired in a drier at 100?, to obtain a water repellency supply cloth impregnated with a nonvolatile component of 20 g/m².

Example 3

| Component | Amount (wt. %) |
|---|---|
| dimethylpolysiloxane solution of trimethyl siloxy silicate (KF-7312K) | 10.0 |
| trimethyl siloxy silicate derivative having hydroxyl groups (Wacker Silicone Resin MK) | 1.0 |
| dimethylpolysiloxane (KF96-10) | 2.0 |
| amino modified dimethylpolysiloxane(X-22-161C) | 2.0 |
| surface active agent (Nonion OP83-RAT) | 1.0 |
| turpentine (Pegasol 3040) | 84.0 |
| total | 100.0 |

The materials from the dimethylpolysiloxane solution of trimethyl siloxy silicate to the surface active agent were dissolved in turpentine, to obtain an agent for treating a water repellency supply cloth. This treating agent was impregnated in blended nonwoven fabric (mixing ratio: 30/70, fabric weight: 70 g/m²) of cotton and polyester by a reverse coater method and thereafter turpentine was transpired in a drier at 100?, to obtain a water repellency supply cloth impregnated with a nonvolatile component of 20 g/m².

Example 4

| Component | Amount (wt. %) |
|---|---|
| dimethylpolysiloxane solution of trimethyl siloxy silicate (VP-1038) | 10.0 |
| trimethyl siloxy silicate derivative having hydroxyl groups (Wacker Silicone Resin MK) | 1.0 |
| amino modified dimethylpolysiloxane (KF-859) | 2.0 |
| dimethylpolysiloxane (KF96-500) | 2.0 |
| surface active agent (Rheodol Super SP-L10) | 1.0 |
| fine powder (Trefil E-604) | 7.0 |
| turpentine (Pegasol 3040) | 77.0 |
| total | 100.0 |

The materials from the dimethylpolysiloxane solution of trimethyl siloxy silicate to the surface active agent were dissolved in turpentine and thereafter the fine powder was homogeneously dispersed to obtain an agent for treating a water repellency supply cloth. This treating agent was impregnated in blended nonwoven fabric (mixing ratio: 50/50, fabric weight: 70 g/m²) of nylon and polyester by a dip roll coater method and thereafter turpentine was transpired in a drier at 100?, to obtain a water repellency supply cloth impregnated with a nonvolatile component of 20 g/m².

Example 5

| Component | Amount (wt. %) |
|---|---|
| dimethylpolysiloxane solution of trimethyl siloxy silicate (DC-593) | 10.0 |

-continued

| Component | Amount (wt. %) |
|---|---|
| trimethyl siloxy silicate derivative having hydroxyl groups (R-910) | 1.0 |
| amino modified dimethylpolysiloxane (KF-859) | 1.5 |
| dimethylpolysiloxane (KF96-500) | 2.0 |
| surface active agent (Nonion OP-83RAT) | 1.0 |
| turpentine (Pegasol 3040) | 20.0 |
| fine powder (ASP-072) | 6.0 |
| water | 58.5 |
| total | 100.0 |

The materials from the dimethylpolysiloxane solution of trimethyl siloxy silicate to the surface active agent were dissolved in turpentine, thereafter a solution obtained by dispersing the fine powder in water was added thereto and the mixture was stirred and homogeneously emulsified to obtain an agent for treating a water repellency supply cloth. This treating agent was impregnated in blended nonwoven fabric (mixing ratio: 90/10, fabric weight: 80 g/m$^2$) of acrylic and polyester by a dip roll coater method and thereafter turpentine was transpired in a drier at 100?, to obtain a water repellency supply cloth impregnated with a nonvolatile component of 20 g/m$^2$.

Example 6

| Component | Amount (wt. %) |
|---|---|
| dimethylpolysiloxane solution of trimethyl siloxy silicate (KF-7312) | 9.0 |
| trimethyl siloxy silicate derivative having hydroxyl groups (R-910) | 1.5 |
| amino modified dimethylpolysiloxane (KF-859) | 1.5 |
| dimethylpolysiloxane (KF96-10) | 2.0 |
| surface active agent (Nonion OP-83RAT) | 1.0 |
| turpentine (Pegasol 3040) | 23.0 |
| fine powder (ARBOCEL BE600-10) | 3.0 |
| water | 59.0 |
| total | 100.0 |

The materials from the dimethylpolysiloxane solution of trimethyl siloxy silicate to the surface active agent were dissolved in turpentine, thereafter the fine powder was homogeneously dispersed and the mixture was stirred with addition of water and homogeneously emulsified to obtain an agent for treating a water repellency supply cloth. This treating agent was impregnated in blended nonwoven fabric (mixing ratio: 25/75, fabric weight: 70 g/m$^2$) of polypropylene and polyester by a dip roll coater method and thereafter turpentine was transpired in a drier at 100?, to obtain a water repellency supply cloth impregnated with a nonvolatile component of 10 g/m$^2$.

Example 7

| Component | Amount (wt. %) |
|---|---|
| dimethylpolysiloxane solution of trimethyl siloxy silicate (VP-1038) | 9.0 |
| trimethyl siloxy silicate derivative having hydroxyl groups (R-910) | 3.5 |

-continued

| Component | Amount (wt. %) |
|---|---|
| amino modified dimethylpolysiloxane (KF-859) | 1.5 |
| dimethylpolysiloxane (KF96-10) | 2.5 |
| surface active agent (Rheodol Super SP-L10) | 1.0 |
| turpentine (Pegasol 3040) | 23.0 |
| fine powder (Trefil E604) | 3.0 |
| water | 56.5 |
| total | 100.0 |

The materials from the dimethylpolysiloxane solution of trimethyl siloxy silicate to the surface active agent were dissolved in turpentine, thereafter the fine powder was homogeneously dispersed and the mixture was stirred with addition of water and homogeneously emulsified to obtain an agent for treating a water repellency supply cloth. This treating agent was impregnated in blended nonwoven fabric (mixing ratio: 50/50, fabric weight: 70 g/m$^2$) of polypropylene and polyester by a dip roll coater method and thereafter turpentine was transpired in a drier at 90?, to obtain a water repellency supply cloth impregnated with a nonvolatile component of 10 g/m$^2$.

Comparative Example 1

| Component | Amount (wt. %) |
|---|---|
| dimethylpolysiloxane (KF96-10) | 12.0 |
| turpentine (Pegasol 3040) | 88.0 |
| total | 100.0 |

Dimethylpolysiloxane was dissolved in turpentine, to obtain a cloth treating agent. With this treating agent, a comparative cloth impregnated with a nonvolatile component of 20 g/m$^2$ was obtained similarly to Example 1.

Comparative Example 2

| Component | Amount (wt. %) |
|---|---|
| amino modified dimethylpolysiloxane (KF-862) | 6.0 |
| dimethylpolysiloxane (KF96-10) | 6.0 |
| turpentine (Pegasol 3040) | 88.0 |
| total | 100.0 |

Amino modified dimethylpolysiloxane and dimethylpolysiloxane were dissolved in turpentine, to obtain a cloth treating agent. With this treating agent, a comparative cloth impregnated with a nonvolatile component of 20 g/m$^2$ was obtained similarly to Example 1.

Comparative Example 3

| Component | Amount (wt. %) |
|---|---|
| dimethylpolysiloxane solution of trimethyl siloxy silicate (VP-1038) | 8.0 |

-continued

| Component | Amount (wt. %) |
|---|---|
| dimethylpolysiloxane (KP96-500) | 2.0 |
| surface active agent (Rheodol Super SP-L10) | 1.0 |
| turpentine (Pegasol 3040) | 25.0 |
| water | 64.0 |
| total | 100.0 |

The materials from the dimethylpolysiloxane solution of trimethyl siloxy silicate to the surface active agent were dissolved in turpentine, and thereafter the mixture was homogeneously emulsified with addition of water to obtain an agent for treating a water repellency supply cloth. With this treating agent, a comparative water repellency supply cloth impregnated with a nonvolatile component of 20 g/m$^2$ was obtained similarly to Example 5.

Comparative Example 4

| Component | Amount (wt. %) |
|---|---|
| dimethylpolysiloxane solution of trimethyl siloxy silicate (VP-1038) | 8.0 |
| dimethylpolysiloxane (KF96-10) | 3.0 |
| surface active agent (Rheodol Super SP-L10) | 1.0 |
| turpentine (Pegasol 3040) | 25.0 |
| fine powder (AROBOCEL 600-10) | 5.0 |
| water | 68.0 |
| total | 100.0 |

The materials from the dimethylpolysiloxane solution of trimethyl siloxy silicate to the surface active agent were dissolved in turpentine, thereafter the fine powder was homogeneously dispersed, and the mixture was stirred with addition of water and homogeneously emulsified to obtain an agent for treating a water repellency supply cloth. With this treating agent, a comparative water repellency supply cloth impregnated with a nonvolatile component of 20 g/m$^2$ was obtained similarly to Example 5.

Evaluation Test

As to the respective water repellency supply cloths of Examples and comparative examples, the following evaluation tests were made with reference to water repellency suppliability, water absorbance and sense of touch on the cloth surfaces: In the evaluation tests, the bonnet of a car painted black was prepared, washed and thereafter cleaned with cleaner wax, and the remaining film part of the wax was removed with an aliphatic solution for providing a test surface. This test surface was divided into 12 sections and thereafter the overall test surface was homogeneously sprinkled with water through an atomizer. Thereafter each section was wiped with each water repellency supply cloth to wipe out waterdrops. As a comparative surface, one section was left in the state sprinkled with water.

Water Repellency Suppliability

① Water-Repellent State Immediately After Treatment

Each test section was watered and the states of formed waterdrops were visually judged for evaluating the performance of each sample in four stages of "⊚: repellent with a large number of waterdrops", "o: repellent but with waterdrops deformed", "Δ: somewhat inferiorly repellent", and "x: hardly repellent".

② Glossiness Immediately After Treatment and Homogeneity of Film

Each test section was visually judged and evaluated in four stages of "⊚: remarkably excellent", "o: excellent", "Δ: average" and "x: inferior".

③ Persistency of Water Repellency

As to persistency of water repellency, washing was performed after a lapse of one month, thereafter each test section was watered and the states of formed waterdrops were visually judged for evaluating persistency of water repellency in four stages of "⊚: repellent with a large number of waterdrops", "o: repellent but with waterdrops deformed", "Δ: somewhat inferiorly repellent", and "x: hardly repellent".

④ Water Absorbance

Water absorbance of each water repellency supply cloth after wiping out sprinkled water was evaluated in four stages of "⊚: remarkably excellent", "o: excellent", "Δ: average" and "x: inferior".

⑤ Sense of Touch

Whether or not each water repellency supply cloth was sticky when touched with a hand was evaluated in four stages of "⊚: remarkably excellent", "o: excellent", "Δ: average" and "x: inferior".

Table 1 shows the results of these tests.

Table 1

As understood from Table 1, not only excellent water repellency and glossiness were attained but also persistency of the water repellency was improved due to the addition of trimethyl siloxy silicate having free hydroxyl groups in the water repellency supply cloth according to each Example. Further, the water absorbance of the cloth was improved due to the addition of the surface active agent, for not only supplying water repellency but also providing excellent water absorbance. In addition, the sense of touch was also improved due to the addition of the fine powder.

According to the inventive water repellency supply cloth, it is possible to supply water repellency to the body of a car with excellent persistency by simply polishing the body of the car or wiping out waterdrops after car washing.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| | Water-Repellent State Immediately After Treatment | Glossiness Immediately After Treatment and Homogeneity of Film | Persistency of Water Repellency | Water Absorbance | Sense of Touch |
|---|---|---|---|---|---|
| Example 1 | ⊚ | ⊚ | ⊚ | Δ | Δ |
| Example 2 | ⊚ | ⊚ | ⊚ | Δ | Δ |
| Example 3 | ⊚ | ⊚ | ⊚ | ○ | Δ |
| Example 4 | ⊚ | ⊚ | ⊚ | ⊚ | ⊚ |
| Example 5 | ⊚ | ⊚ | ⊚ | ⊚ | ⊚ |
| Example 6 | ⊚ | ⊚ | ⊚ | ⊚ | ⊚ |
| Example 7 | ⊚ | ⊚ | ⊚ | ⊚ | ⊚ |
| Comparative Example 1 | Δ | ○ | × | Δ | Δ |
| Comparative Example 2 | Δ | ○ | × | Δ | Δ |
| Comparative Example 3 | ⊚ | ⊚ | Δ | ○ | Δ |
| Comparative Example 4 | ⊚ | ⊚ | Δ | ⊚ | ⊚ |

What is claimed is:

1. A water repellency supply cloth prepared by impregnating cloth with a nonvolatile component in an agent for treating a water repellency supply cloth containing an organopolysiloxane solution of trimethyl siloxy silicate expressed in the following general formula (1), containing a trimethyl siloxy silicate derivative having free hydroxyl groups:

$$[(CH_3)_3SiO_{1/2}]_x \cdot [SiO_2]_y \qquad (1)$$

where X=1 to 3 and Y=0.5 to 8.

2. The water repellency supply cloth in accordance with claim 1, wherein said agent contains amino modified dimethylpolysiloxane.

3. The water repellency supply cloth in accordance with claim 2, wherein said agent contains a surface active agent.

4. The water repellency supply cloth in accordance with claim 3, wherein said agent contains organic or inorganic fine powder.

5. The water repellency supply cloth in accordance with claim 1, wherein said agent contains a surface active agent.

6. The water repellency supply cloth in accordance with claim 1, wherein said agent contains organic or inorganic fine powder.

7. The water repellency supply cloth in accordance with any one of claims 1–6, wherein said agent contains 10 to 60 parts by weight of said trimethyl siloxy silicate derivative for 100 parts by weight of said trimethyl siloxy silicate.

8. The water repellency supply cloth in accordance with claim 7, wherein said cloth includes ultrafine fiber of less than 0.3 denier.

9. The water repellency supply cloth in accordance with any one of claims 1–6, prepared by impregnating 100 parts by weight of said cloth with said nonvolatile component corresponding to 1.0 to 50.0 parts by weight of said agent for treating a water repellency supply cloth.

10. The water repellency supply cloth in accordance with claim 9, wherein said cloth includes ultrafine fiber of less than 0.3 denier.

* * * * *